(12) United States Patent
Harvi et al.

(10) Patent No.: US 11,432,303 B2
(45) Date of Patent: Aug. 30, 2022

(54) METHOD AND APPARATUS FOR MAXIMIZING A NUMBER OF CONNECTIONS THAT CAN BE EXECUTED FROM A MOBILE APPLICATION

(71) Applicant: Synchronoss Technologies, Inc., Bridgewater, NJ (US)

(72) Inventors: Sharana Basava Harvi, Bridgewater, NJ (US); Stephen Gurnett, Valenciennes (FR)

(73) Assignee: Synchronoss Technologies, Inc, Bridgewater, NJ (US)

( * ) Notice: Subject to any disclaimer, the term of this patent is extended or adjusted under 35 U.S.C. 154(b) by 0 days.

(21) Appl. No.: 17/137,482

(22) Filed: Dec. 30, 2020

(65) Prior Publication Data

US 2022/0210791 A1 Jun. 30, 2022

(51) Int. Cl.
*H04W 72/10* (2009.01)
*H04W 4/16* (2009.01)
*H04W 76/10* (2018.01)

(52) U.S. Cl.
CPC ............ *H04W 72/10* (2013.01); *H04W 4/16* (2013.01); *H04W 76/10* (2018.02)

(58) Field of Classification Search
CPC ..... H04W 72/10; H04W 76/10; H04W 76/30; H04W 76/36; H04W 4/10; H04W 28/18; H04W 28/08; H04W 4/90; H04W 28/14; H04W 48/16; H04W 74/04; H04W 76/45; H04W 8/18; H04W 68/02; H04W 72/0413; H04W 84/08; H04W 36/08; H04W 4/00; H04W 4/02; H04W 76/50; H04L 47/70; H04L 47/805; H04L 47/245; H04L 47/762; H04L 47/14; H04L 47/15; H04L 47/24; H04L 47/6215; H04L 47/824;

(Continued)

(56) References Cited

U.S. PATENT DOCUMENTS 10,743,168 B1 *   8/2020   Erenel .................... H04W 4/90
2002/0178232 A1  11/2002   Ferguson (Continued)

FOREIGN PATENT DOCUMENTS

CN          108206854 A       6/2018

OTHER PUBLICATIONS

Apr. 19, 2022, International Search Report of PCT/US2021/065795.

*Primary Examiner* — Golam Sorowar
(74) *Attorney, Agent, or Firm* — Banner & Witcoff, Ltd.

(57) ABSTRACT

A computer implemented method and system for maximizing a number of connections that can be executed from a mobile application is disclosed. The method comprises determining whether a connection slot is available for a received call request; executing the call when a connection slot is available; processing the call request when a connection slot is not available, where processing comprises: determining a priority level for the request; when the determined priority level is a low priority, putting the request in a queue for later processing; and when the determined priority level is a high priority, when a low priority call is in progress, performing the steps of: canceling the in-progress low priority call; placing the cancelled low priority call in a queue for later processing; and executing the high priority call; and when no low priority call is in progress, placing the high priority call request in the queue.

18 Claims, 6 Drawing Sheets

(58) Field of Classification Search
CPC .............. H04L 12/1827; H04L 12/185; H04L 12/40058; H04L 12/6418; H04L 2012/6464; H04L 47/30; H04L 47/765; H04L 47/801; H04L 47/806; H04L 47/822; H04L 65/1096
See application file for complete search history.

(56) References Cited

U.S. PATENT DOCUMENTS

| | | | |
|---|---|---|---|
| 2006/0268692 A1* | 11/2006 | Wright | ................ H04L 47/2416 |
| | | | 370/229 |
| 2013/0336240 A1* | 12/2013 | Cherian | .............. H04L 61/2015 |
| | | | 370/329 |
| 2014/0120939 A1* | 5/2014 | Mang | ................... H04W 76/30 |
| | | | 455/453 |
| 2015/0341282 A1 | 11/2015 | Bar-On et al. | |

* cited by examiner

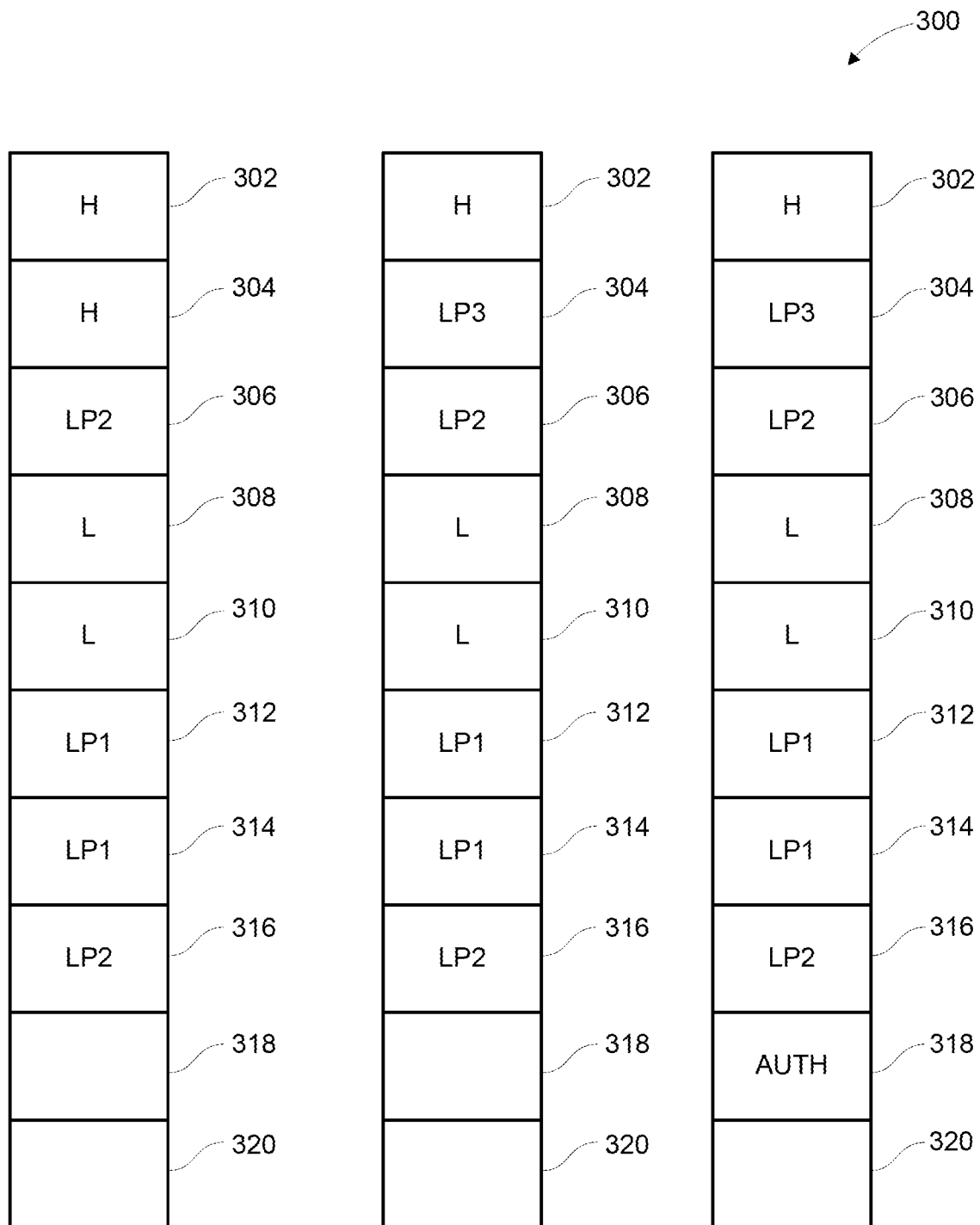

METHOD AND APPARATUS FOR MAXIMIZING A NUMBER OF CONNECTIONS THAT CAN BE EXECUTED FROM A MOBILE APPLICATION

BACKGROUND OF THE INVENTION

Field of the Invention

Embodiments of the present invention generally relate to mobile application performance, and more specifically to a method for maximizing a number of connections that can be executed from a mobile application.

Description of the Related Art

A finite number of connections may be executed concurrently from a mobile application. When the number of connections that are needed exceed the number of available connections, call requests, sometimes important call requests, are blocked while other less important call requests finished. For example, in a mobile application where thumbnail images are displayed, thirty or more thumbnails may need to be fetched from a server. However, other more important tasks must also be performed, such as maintaining updated content on the mobile application. If there are for example, ten connections available for the mobile application, the more important content update will be blocked until the thumbnail images are finished downloading. The downloading images may no longer be relevant to the mobile application, yet the low priority download takes precedent over the higher priority content update due to the first-come-first-serve nature of requests. This creates an unresponsive mobile application and a poor user experience.

Therefore, there is a need for a method for maximizing a number of connections that can be executed from a mobile application.

SUMMARY OF THE INVENTION

An apparatus and/or method is provided for maximizing a number of connections that can be executed from a mobile application substantially as shown in and/or described in connection with at least one of the FIGS.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIGS. 3A-3G depict concurrent connections from a mobile application, according to one or more embodiments of the invention.

Figure 1:
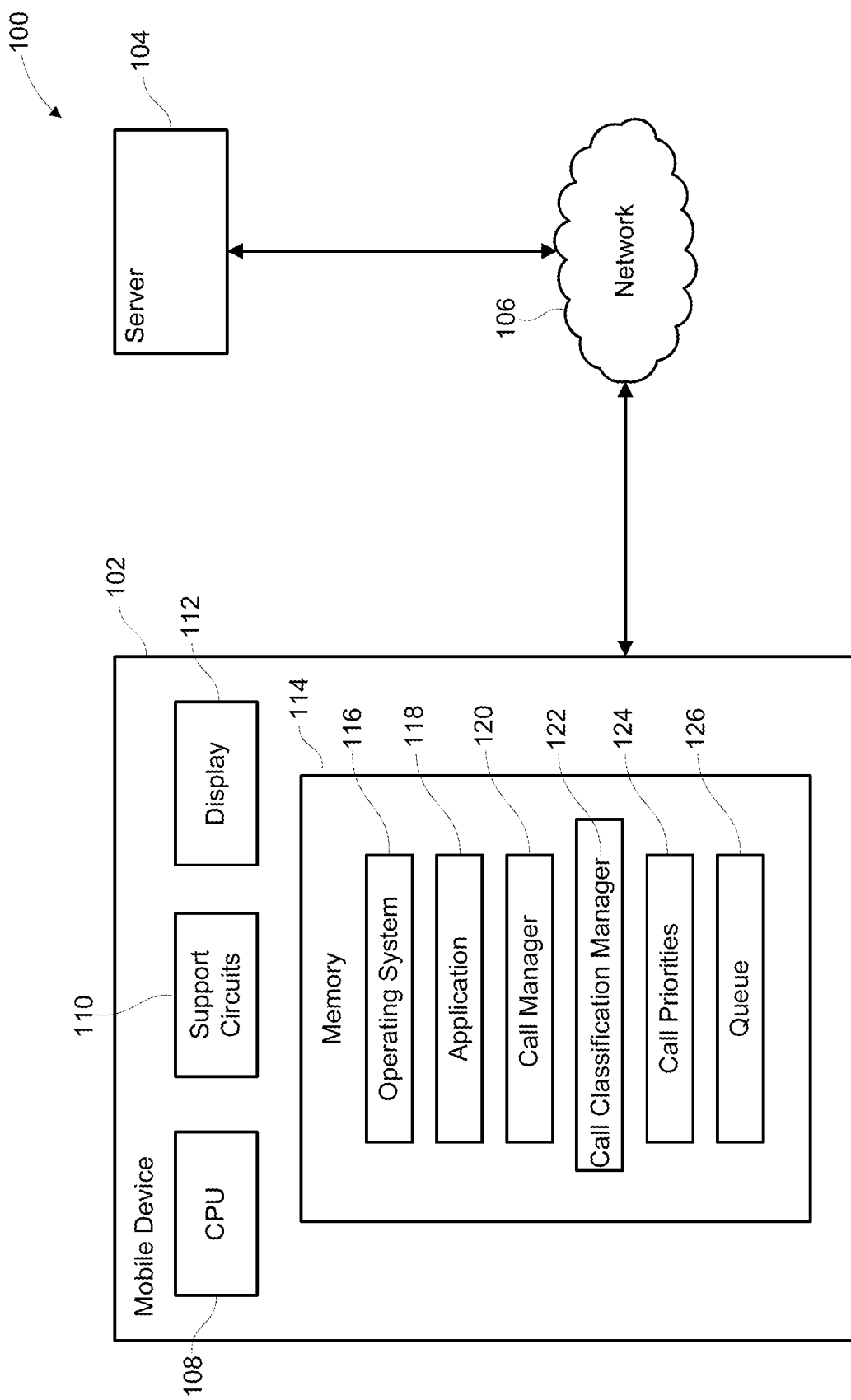
FIG. 1 depicts a block diagram of a system for maximizing a number of connections that can be executed from a mobile application, according to one or more embodiments of the invention.

While the method and apparatus for maximizing a number of connections that can be executed from a mobile application is described herein by way of example for several embodiments and illustrative drawings, those skilled in the art will recognize that the method and apparatus for maximizing a number of connections that can be executed from a mobile application is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for maximizing a number of connections that can be executed from a mobile application defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Techniques are disclosed for an apparatus and method for maximizing a number of connections that can be executed from a mobile application, according to embodiments of the invention. The disclosed method for maximizing a number of connections that can be executed from a mobile application, includes setting a priority for each call request that is possible from a mobile application. The priorities may be as simple as high and low and within each priority level, there may be secondary priorities rankings. For example, within the high priority category, there may be three or more secondary categories HP1, HP2, HP3, and the like, where HP1 is a higher priority call than HP2, and HP2 is a higher priority than HP3, and so on. Similarly, the low priority level may also include secondary low priority categories, such as LP1, LP2, LP3, and the like. The secondary priorities order calls that are waiting. If a first call request has a priority of HP3 and a second call request with a priority of HP2 is received after the HP3 call request is already in queue, the HP2 call request will be serviced ahead of the HP3 call request when a slot becomes available.

A number of allowable concurrent connections is determined for the mobile application. Each call request or response uses a connection. As used herein, the connection used by a call request or response is referred to as a "slot". A number of slots that may be run concurrently is allocated such that one slot for each priority level is reserved and remains available for authentication requests, re-authentication requests, and renewing token requests, referred to herein as a "reserved slot". When a low priority call request is received, if a slot is available, the slot is given to the call request. However, if no slot is available, then the call request is placed in a queue until a slot becomes available. When a high priority call request is received, it is given an available slot. However, if no slot is available, a low priority request that is currently executing is cancelled and placed in the queue and the high priority request is given the slot that was used by the low priority call. The reserved slots remain available for authentication requests, re-authentication requests, and renewing token requests.

Various embodiments of a method and apparatus for maximizing a number of connections that can be executed from a mobile application are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 depicts a block diagram of an system 100 for maximizing a number of connections that can be executed from a mobile application, according to one or more embodiments of the invention. The system 100 includes a mobile device 102, a server 104, communicatively connected via network 106.

The mobile device 102 is a computing device, such as a desktop computer, laptop, tablet computer, smartphone, smartwatch or other wearable, smart speaker with a screen, and the like. The mobile device 102 includes a Central Processing Unit (CPU) 108, support circuits 110, a display 112, and a memory 114. The CPU 108 may include one or more commercially available microprocessors or microcontrollers that facilitate data processing and storage. The various support circuits 110 facilitate the operation of the CPU 108 and include one or more clock circuits, power supplies, cache, input/output circuits, and the like. The memory 114 includes at least one of Read Only Memory (ROM), Random Access Memory (RAM), disk drive storage, optical storage, removable storage and/or the like. The memory 114 includes an operating system 116, application 118, a call manager 120, a call classification manager 122, stored call priorities 124, and a queue 126. The operating system 116 may include various commercially known operating systems. The server 104 may be in the cloud and may be the backend server for the application 118. In some embodiments, there may be a plurality of servers 104. Call requests from the application 118 may use network 106 to communication with server 104.

The call classification manager 122 sets a priority for each type of network call request that may be made from the application 118. For example, an authentication request or a call that affects the experience of a user, such as a synchronization (e.g., favoriting or deleting content) call may be classified as high priority calls. Displaying thumbnail images may be classified as high priority but may be considered secondary to an authentication call. As such, synchronization calls may be given an HP1 classification, while thumbnail display calls may be given an HP2 classification. Calls that may be temporarily delayed without noticeable impact on the user experience may be classified as low priority (LP1). The call classifications are stored as call priorities 124.

The call manager 120 determines a number of allowable concurrent network connections for the application 118. Each call request or response uses a connection (i.e., takes up one slot). The call manager 120 allocates a number of slots such that for each priority level, the call manager 120 allocates one slot, referred to as a "reserved slot". In some embodiments, the call manager 120 allocates reserved slots based on the needs of the application 118. For example, the application 118 may only require one type of authentication. In such case, the call manager 120 would allocate one reserved slot. If the application 118 requires authentication and re-authentications, the call manager 120 may reserve two slots. When a call request is received, the call manager 120 processes the call request. If a slot is available, the slot is given to the call request and the call associated with the call request is executed. However, if no slot is available, then the call manager 120 determines the priority level of the call request using the call priorities 124. If the call request is a low priority call, the call manager 120 places the low-priority call request in the queue 126. However, if the call request is a high priority call request then the call manager 120 determines whether there is a low priority call among the calls that are in progress. If there are low-priority calls in progress, a low priority call is cancelled and placed in the queue 126 until a slot becomes available for its execution. In some embodiments, the call manager 120 selects the low priority call with the lowest secondary priority and cancels and queues said low-priority call. If the call request is a high priority call request and no slots are available, and the call manager 120 determines that all slots are being utilized for high priority call execution, then high priority call request is placed in queue 126. If a high priority call request is received that requires a re-authentication and all slots are filled with high and low priority calls, the call manager 120 executes the re-authentication request in a reserved slot and executes the high priority in a slot according to the above description.

When a call completes, the call manager 120 gives the newly available slot to the call request in the queue 126 with the highest priority.

Figure 2:
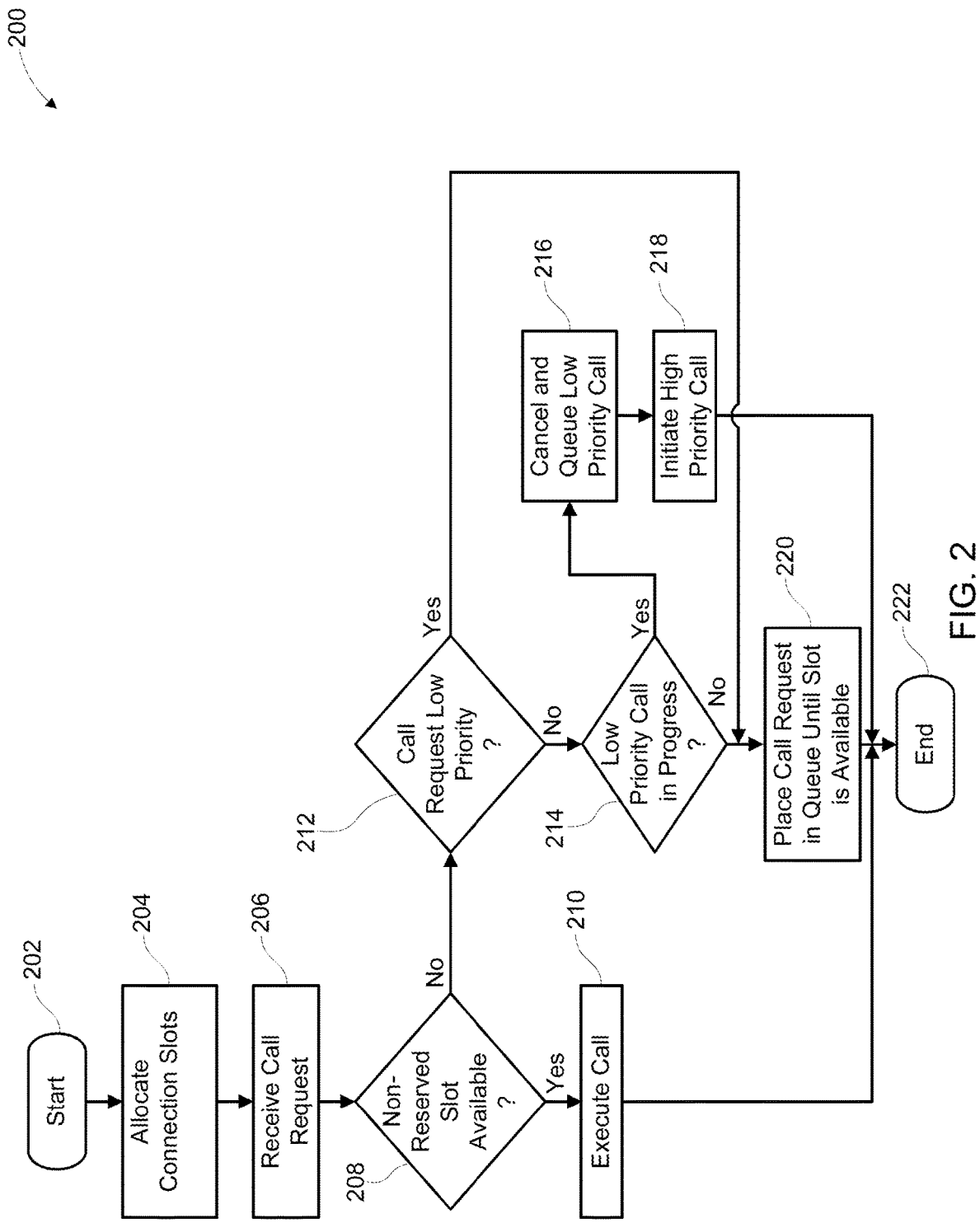
FIG. 2 depicts a flow diagram of a method for maximizing a number of connections that can be executed from a mobile application, according to one or more embodiments of the invention.

FIG. 2 depicts a flow diagram of a method 200 for maximizing a number of connections that can be executed from a mobile application, according to one or more embodiments of the invention. The method 200 starts at step 202 and proceeds to step 204.

At step 204, a plurality of connection slots is allocated for network calls. As an example, a mobile application allows ten concurrent network connections. The number of concurrent network connections allowed may be defined by the mobile device. In the present example, where there are ten slots allowed, two slots may be reserved, one for each priority level. In some embodiments, the number of reserved and non-reserved slots is configurable based on the needs of the mobile application. For example, if the mobile application simply requires authentication, one reserve slot may be allocated. However, if the mobile application requires authentication and re-authentication, two reserve slots may be allocated.

At step 206, a call request is received. The call request is from the mobile application and requires a network connection.

At step 208, it is determined whether there are any non-reserved slots available for the call request. If there are available slots, then at step 210, the call is executed using one of the available slots. However, if there are no non-reserved slots available, then the method 200 proceeds to step 212.

At step 212, it is determined whether the call request is a high priority call request or a low priority call request. If the call request is a low priority call request, then the method proceeds to step 220, where the call request is placed in a queue until a connection slot becomes available for the call request. However, if the call request is a high priority call request, then the method 200 proceeds to step 214.

At step 214, it is determined whether there are any low priority calls in progress (i.e., executing in one of the connection slots). If there is a low priority call in progress, then at step 216, the low priority call is canceled and placed in the queue until a connection slot becomes available for the call request. At step 218, the high priority call is initiated in the slot that was just made available by canceling the low priority call and the method 200 proceeds to step 222.

However, if at step 214, it is determined that no low priority calls are in progress (i.e., all calls in progress are high priority calls), then the method 200 proceeds to step 220, where the call request is placed in a queue until a connection slot becomes available for the call request.

At step 222, the method 200 ends.

Figures 3A, 3B:
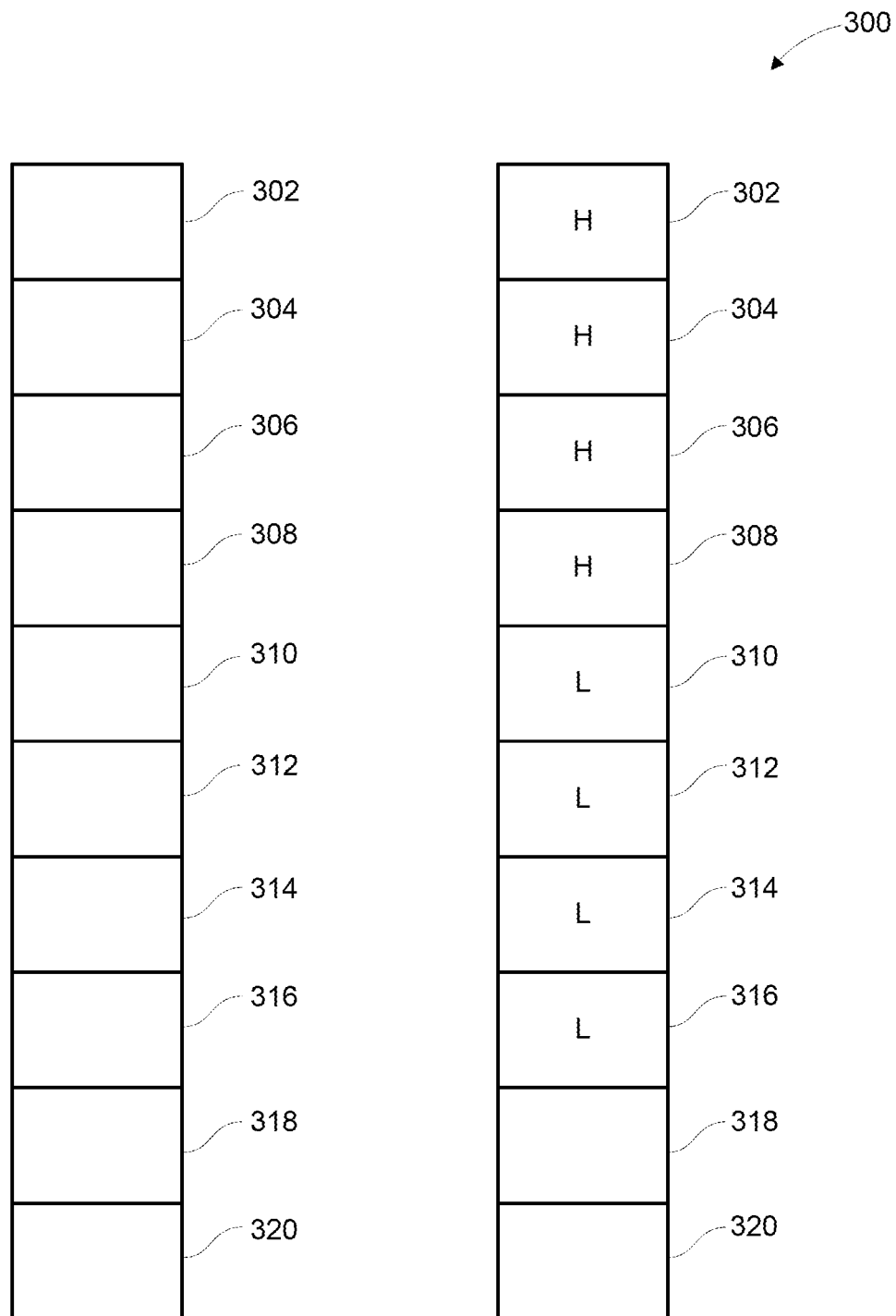

FIGS. 3A-3G depict connections slots 300 during processing of incoming calls, according to one or more embodiments of the invention. In FIG. 3A, there are ten (10) connection slots available. Slots 302, 304, 306, 308, 310, 312, 314, and 316 are allocated as non-reserved slots. Slots 318 and 320 are reserved, for special call requests, such as authentication call requests, re-authentication call requests, renewing token requests, and the like, when needed and to avoid blocking high priority calls. Although the slots are numbered for ease of description, in practice, there is no order to the connection slots.

FIG. 3B depicts the connection slots 300 while a number of network calls are being executed. Slots 302, 304, 306, and 308 are high priority calls in execution. Slots 310, 312, 314, and 316 are low priority calls in execution. Slots 318 and 320 are free in the event an authentication/re-authentication/token call request is received.

Figures 3C, 3D:
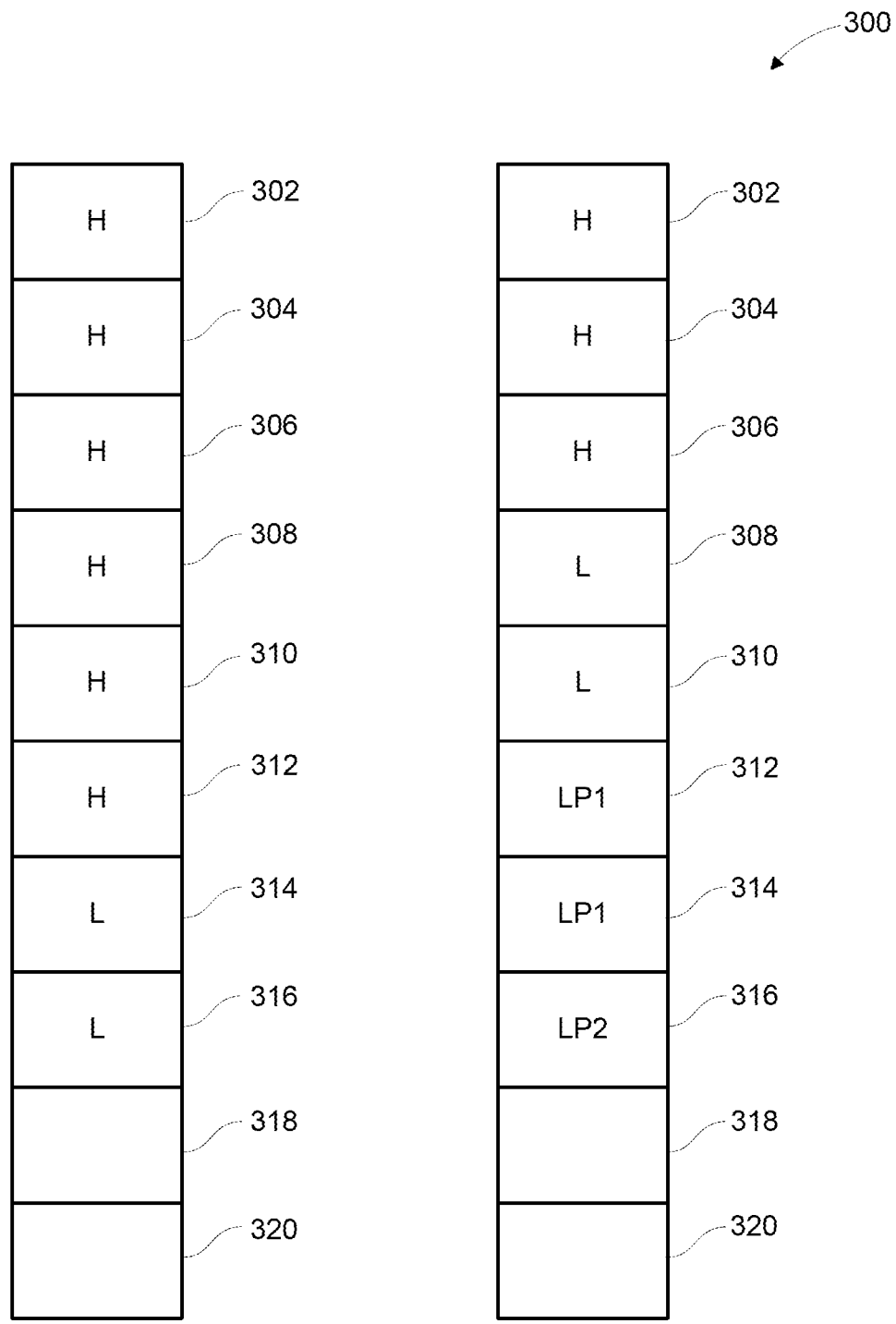

FIG. 3C depicts the transition from connection slots 300 in FIG. 3B to connection slots 300 when new high priority calls are received. In FIG. 3C, two new high priority calls are initiated. Slots 302, 304, 306, and 308 are already being used for high priority calls in execution. Slots 310 and 312 are taken for execution of the two new high priority calls. The low priority calls that had been executing in slots 310 and 312 are canceled and put into a queue for execution when slots are freed up Slots 314 and 316 remain in use for the low priority calls in execution. Slots 318 and 320 remain free in the event an authentication/re-authentication/token call request is received.

FIG. 3D depicts the transition from the connection slots in FIG. 3C to connection slots 300 where a number of high priority calls complete and low priority calls from in queue are placed in the newly available slots. Three high priority calls complete. As such slots 302, 304, and 306 remain in use for high priority calls in execution. Slots 308 and 310 are able to be used for low priority calls with the additional slots 312, 314, and 316 available for low priority calls. Slots 318 and 320 are free in case a new high priority call request is received. With five slots available for low priority calls, the two low priority calls from FIG. 3C continue to execute while three low priority calls may be pulled off the queue. In the present example, there are five low priority calls in the queue, with priorities of LP1, LP3, LP2, LP2, and LP1, respectively. As such, the low priority calls with higher secondary priorities (LP1 and LP2) are executed first. As such, LP1, LP1, and LP2 are executed in slots 312, 314, and 316. Now, three high priority calls are executing, five low priority calls are executing, two slots (slot 318 and 320) remain free in the event an authentication/re-authentication/token call request is received, and two low priority calls still in the queue.

FIG. 3E depicts the transition from the connection slots in FIG. 3D to connection slots 300 where one high priority call completes. Slots 302 and 304 are being used for high priority calls in execution. Slot 306 is freed when the high priority call completes. As such a low priority call that is still in the queue may use slot 306. The low priority call with the highest secondary priority (L2) is selected to be executed in slot 306. Slots 308, 310, 312, 314, and 316 are being used for low priority calls in execution. Slots 318 and 320 are free in the event an authentication/re-authentication/token call request is received.

FIG. 3F depicts the transition from the connection slots in FIG. 3E to connection slots 300 where one more high priority call completes. Slot 302 is still being used for a high priority call in execution. Slot 304 is freed when the high priority call in slot 304 completes. As such a low priority call that is still in the queue may use slot 304. Slots 306, 308, 310, 312, 314, and 316 are being used for low priority calls in execution. Slots 318 and 320 remain free in the event an authentication/re-authentication/token call request is received.

FIG. 3G depicts the transition from the connection slots in FIG. 3F to connection slots 300 where a reserved slot must be utilized. Slot 302 is being used fora high priority call in execution. Slots 304, 306, 308, 310, 312, 314, and 316 are being used for low priority calls in execution. Slots 318 and 320 are free in the event a new high priority call request is received. The high priority call request in slot 302 requires a re-authentication. All of the slots are in use. As such, the authentication call uses the reserved slot 318. The slot 318 may be used immediately to avoid delay in waiting for a slot to become available. When the re-authentication call is complete, the high priority call may proceed and the reserved slot 318 if free and waiting for a next authentication/re-authentication/token call request.

Figure 4:
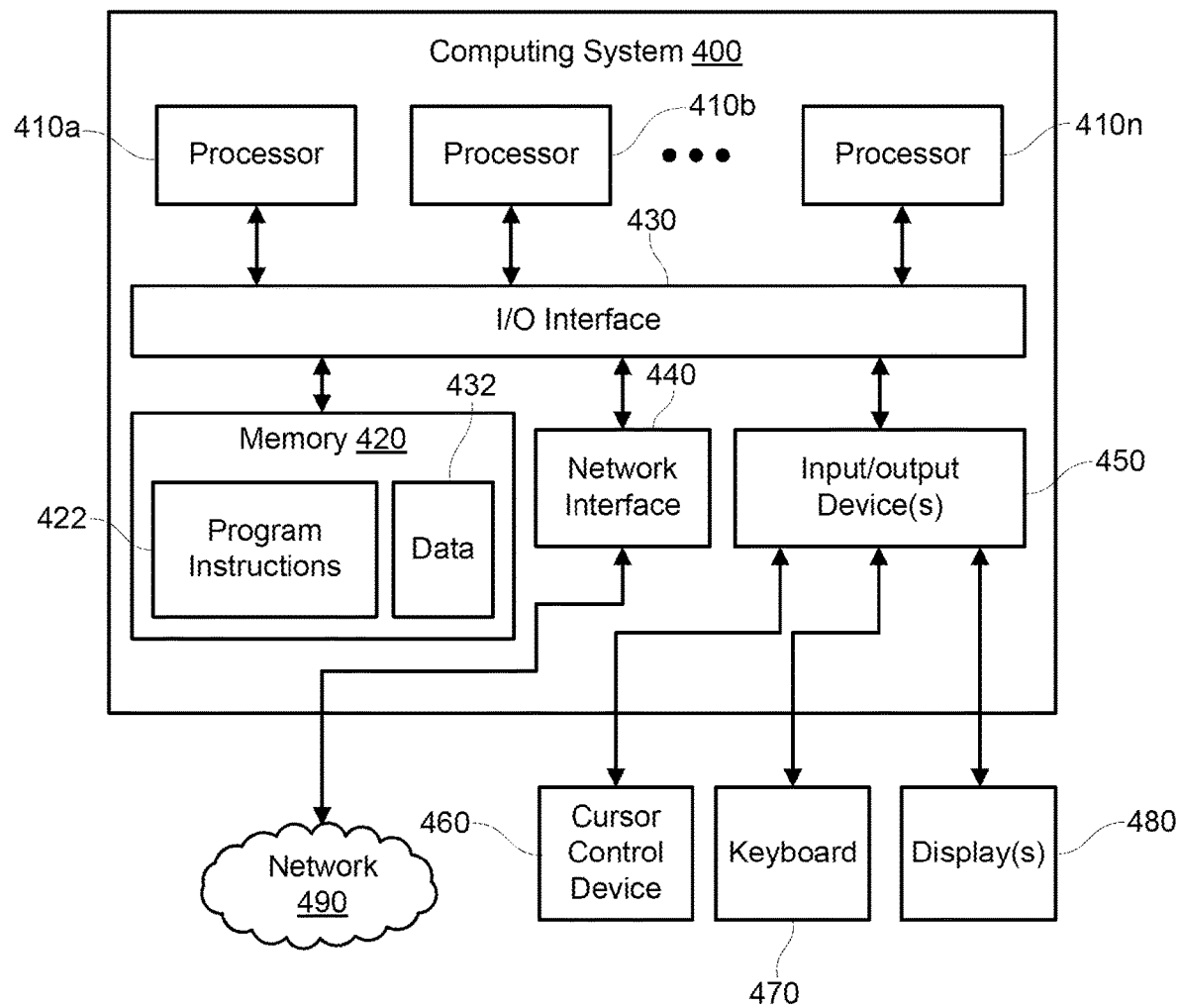
FIG. 4 depicts a computer system that can be utilized in various embodiments of the present invention to implement the computer and/or the display, according to one or more embodiments of the invention.

FIG. 4 depicts a computer system that can be used to implement the method of FIG. 2 in various embodiments of the present invention. Various embodiments of a method and apparatus for maximizing a number of connections that can be executed from a mobile application, as described herein, may be executed on one or more computer systems, which may interact with various other devices. One such computer system is computer system 400 illustrated by FIG. 4, which may in various embodiments implement any of the elements or functionality illustrated in FIGS. 1-3. In various embodiments, computer system 400 may be configured to implement methods described above. The computer system 400 may be used to implement any other system, device, element, functionality or method of the above-described embodiments. In the illustrated embodiments, computer system 400 may be configured to implement method 200, as processor-executable executable program instructions 422 (e.g., program instructions executable by processor(s) 410) in various embodiments.

In the illustrated embodiment, computer system 400 includes one or more processors 410 coupled to a system memory 420 via an input/output (I/O) interface 430. Computer system 400 further includes a network interface 440 coupled to I/O interface 430, and one or more input/output devices 450, such as cursor control device 460, keyboard 470, and display(s) 480. In various embodiments, any of components may be utilized by the system to receive user input described above. In various embodiments, a user interface (e.g., user interface 430) may be generated and displayed on display 480. In some cases, it is contemplated that embodiments may be implemented using a single instance of computer system 400, while in other embodiments multiple such systems, or multiple nodes making up computer system 400, may be configured to host different portions or instances of various embodiments. For example, in one embodiment some elements may be implemented via one or more nodes of computer system 400 that are distinct from those nodes implementing other elements. In another example, multiple nodes may implement computer system 400 in a distributed manner.

In different embodiments, computer system 400 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 400 may be a uniprocessor system including one processor 410, or a multiprocessor system including several processors 410 (e.g., two, four, eight, or another suitable number). Processors 410 may be any suitable processor capable of executing instructions. For example, in various embodiments processors 410 may be general-purpose or embedded processors implementing any of a variety of instruction set architectures (ISAs), such as the x96, PowerPC, SPARC, or MIPS ISAs, or any other suitable ISA. In multiprocessor systems, each of processors 410 may commonly, but not necessarily, implement the same ISA.

System memory 420 may be configured to store program instructions 422 and/or data 432 accessible by processor 410. In various embodiments, system memory 420 may be implemented using any suitable memory technology, such as static random access memory (SRAM), synchronous dynamic RAM (SDRAM), nonvolatile/flash-type memory, persistent storage (magnetic or solid state), or any other type of memory. In the illustrated embodiment, program instructions and data implementing any of the elements of the embodiments described above may be stored within system memory 420. In other embodiments, program instructions and/or data may be received, sent or stored upon different types of computer-accessible media or on similar media separate from system memory 420 or computer system 400.

In one embodiment, I/O interface 430 may be configured to coordinate I/O traffic between processor 410, system memory 420, and any peripheral devices in the system, including network interface 440 or other peripheral interfaces, such as input/output devices 450, In some embodiments, I/O interface 430 may perform any necessary protocol, timing or other data transformations to convert data signals from one component (e.g., system memory 420) into a format suitable for use by another component (e.g., processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. Also, in some embodiments some or all of the functionality of I/O interface 430, such as an interface to system memory 420, may be incorporated directly into processor 410.

Network interface 440 may be configured to allow data to be exchanged between computer system 400 and other devices attached to a network (e.g., network 490), such as one or more external systems or between nodes of computer system 400. In various embodiments, network 490 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 440 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 450 may, in some embodiments, include one or more display terminals, keyboards, keypads, touch pads, scanning devices, voice or optical recognition devices, or any other devices suitable for entering or accessing data by one or more computer systems 400. Multiple input/output devices 450 may be present in computer system 400 or may be distributed on various nodes of computer system 400. In some embodiments, similar input/output devices may be separate from computer system 400 and may interact with one or more nodes of computer system 400 through a wired or wireless connection, such as over network interface 440.

In some embodiments, the illustrated computer system may implement any of the methods described above, such as the method illustrated by the flowchart of FIG. 2. In other embodiments, different elements and data may be included.

Those skilled in the art will appreciate that computer system 400 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 400 may be transmitted to computer system 400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method for maximizing a number of connections that can be executed from a mobile application, comprising:
    allocating, by a computing device and to the mobile application, a plurality of connection slots for a plurality of types of network calls, wherein the plurality of types of network calls comprises one or more requests from the mobile application to a server;
    receiving, from the mobile application, a first call request requiring a first network connection, wherein the first call request comprises a request to update information associated with the mobile application;
    determining whether a first connection slot, of the plurality of connection slots, is available for the first call request;
    executing a first call associated with the first call request based on a determination that a first connection slot is available;
    receiving, from the mobile application, a second call request requiring a second network connection;
    determining whether a second connection slot, of the plurality of connection slots, is available for the second call request;
    based on a determination that the second connection slot is not available, determining whether the second call request has a higher priority than the first call request;
    cancelling, based on a determination that the second call request has a higher priority than the first call request, the first call;
    executing a second call associated with the second call request;
    receiving, from the mobile application, a third call request requiring a third network connection;
    determining whether a third connection slot, of the plurality of connection slots, is available for the third call request;
    based on a determination that the third connection slot is not available, determining whether the third call request has a higher priority than the second call request;
    placing, based on a determination that the third call request does not have a higher priority than the second call request, a third call in a queue.

2. The computer implemented method of claim 1, wherein allocating the connection slots comprises reserving one or more connection slots, with each of the one or more connection slots being associated with a different priority level.

3. The computer implemented method of claim 1, wherein the determining whether the second call request has a higher priority than the first call request comprises determining whether the second call request comprises at least one of: an authentication, a re-authentication, or a renewal of a token.

4. The computer implemented method of claim 1, wherein a priority level associated with the first call request comprises a primary priority and a secondary priority.

5. The computer implemented method of claim 1, further comprising:
    in response to cancelling the first call, placing the first call in a queue; and
    re-executing the first call when a connection slot becomes available.

6. The computer implemented method of claim 1, wherein the determining whether the second call request has a higher priority than the first call request comprises:
    determining whether the second call request is authentication-related that affects a user experience when navigating the mobile application; and determining whether a disruption of the first call would be noticeable to the user if temporarily delayed.

7. A mobile device configured to maximize a number of connections that can be executed from a mobile application comprising:
one or more processors; and
memory comprising instructions that, when executed by the one or more processors, cause the mobile device to:
allocate, to the mobile application, a plurality of connection slots for a plurality of types of network calls, the plurality of types of network calls comprises one or more requests from the mobile application to a server;
receive, from the mobile application, a first call request requiring a first network connection, wherein the first call request comprises a request to update information associated with the mobile application;
determine whether a first connection slot, of the plurality of connection slots, is available for the first call request;
execute a first call associated with the first call request based on a determination that a first connection slot is available;
receive, from the mobile application, a second call request requiring a second network connection;
determine whether a second connection slot, of the plurality of connection slots, is available for the second call request;
based on a determination that the second connection slot is not available, determine whether the second call request has a higher priority than the first call request;
cancel, based on a determination that the second call request has a higher priority than the first call request, the first call;
execute a second call associated with the second call request;
receive, from the mobile application, a third call request requiring a third network connection;
determine whether a third connection slot, of the plurality of connection slots, is available for the third call request;
based on a determination that the third connection slot is not available, determine whether the third call request has a higher priority than the second call request;
place, based on a determination that the third call request does not have a higher priority than the second call request, a third call in a queue.

8. The mobile device of claim 7, wherein allocating the connection slots comprises reserving one or more connection slots, with each of the one or more connection slots being associated with a different priority level.

9. The mobile device of claim 7, wherein the instructions, when executed by the one or more processors, cause the mobile device to determine whether the second call request has a higher priority than the first call request by determining whether the second call request comprises at least one of: an authentication, a re-authentication, or a renewal of a token.

10. The mobile device of claim 7, wherein a priority level associated with the first call request comprises a primary priority and a secondary priority.

11. The mobile device of claim 7, wherein the instructions, when executed by the one or more processors, cause the mobile device to:
place the first call in a queue in response to cancelling the first call; and
re-execute the first call when a connection slot becomes available.

12. The mobile device of claim 7, wherein the instructions, when executed by the one or more processors, cause the mobile device to determine whether the second call request has a higher priority than the first call request by:
determining whether the second call request is authentication-related that affects a user experience when navigating the mobile application; and
determining whether a disruption of the first call would be noticeable to the user if temporarily delayed.

13. A non-transitory computer readable medium storing instructions that, when executed, cause a mobile device, configured to maximize a number of connections that can be executed from a mobile application, to:
allocate, to the mobile application, a plurality of connection slots for a plurality of types of network calls, wherein the plurality of types of network calls comprises one or more requests from the mobile application to a server;
receive, from the mobile application, a first call request requiring a first network connection, wherein the first call request comprises a request to update information associated with the mobile application;
determine whether a first connection slot, of the plurality of connection slots, is available for the first call request;
execute a first call associated with the first call request based on a determination that a first connection slot is available;
receive, from the mobile application, a second call request requiring a second network connection;
determine whether a second connection slot, of the plurality of connection slots, is available for the second call request;
based on a determination that the second connection slot is not available, determine whether the second call request has a higher priority than the first call request;
cancel, based on a determination that the second call request has a higher priority than the first call request, the first call;
execute a second call associated with the second call request;
receive, from the mobile application, a third call request requiring a third network connection;
determine whether a third connection slot, of the plurality of connection slots, is available for the third call request;
based on a determination that the third connection slot is not available, determine whether the third call request has a higher priority than the second call request;
place, based on a determination that the third call request does not have a higher priority than the second call request, a third call in a queue.

14. The non-transitory computer readable medium of claim 13, wherein allocating the connection slots comprises reserving one or more connections slots, with each of the one or more connection slots being associated with a different priority level.

15. The non-transitory computer readable medium of claim 13, wherein the instructions, when executed by the one or more processors, cause the mobile device to determine whether the second call request has a higher priority than the first call request by determining whether the second call request comprises at least one of: an authentication, a re-authentication, or a renewal of a token.

16. The non-transitory computer readable medium of claim 13, wherein a priority level associated with the first call request comprises a primary priority and a secondary priority.

17. The non-transitory computer readable medium of claim 13, wherein the instructions, when executed, cause the mobile device to:
   place the first call in a queue in response to cancelling the first call; and
   re-execute the first call when a connection slot becomes available.

18. The non-transitory computer readable medium of claim 13, wherein the instructions, when executed, cause the mobile device to determine whether the second call request has a higher priority than the first call request by:
   determining whether the second call request is authentication-related that affects a user experience when navigating the mobile application; and
   determining whether a disruption of the first call would be noticeable to the user if temporarily delayed.

* * * * *